Patented Aug. 5, 1952

2,606,151

UNITED STATES PATENT OFFICE 2,606,151

METHOD OF MAKING DRILLING FLUIDS

Paul W. Fischer, Long Beach, and Raymond A. Rogers, Wilmington, Calif., assignors to Union Oil Company of California, Los Angeles, Calif., a corporation of California No Drawing. Application May 7, 1949, Serial No. 92,086

16 Claims. (Cl. 252—8.5)

This invention relates to a method of making drilling fluids employed in earth-boring operations, and in particular concerns a specific mode of procedure for preparing certain water-base drilling fluid compositions.

In our copending application, Serial No. 787,858, filed November 24, 1947, of which this application is a continuation-in-part, there are disclosed water-base drilling fluid compositions essentially comprising an aqueous suspension or dispersion of clay, a water-soluble polyvalent metal salt, and certain water-soluble cellulose ethers. Such a drilling fluid may consist, for example, of an aqueous phase having suspended or dispersed therein an amount of a colloidal clay sufficient to provide an apparent density of about 72 pounds per cubic foot, from about 0.01 to about 5.0 per cent by weight of a water-soluble polyvalent metal salt such as calcium chloride, and sufficient of a water-soluble cellulose ether which does not form insoluble salts with polyvalent metal ions, e. g., methyl cellulose, to impart to the composition a filtration rate, or "fluid loss value" below about 45 ml. per hour. The drilling fluids of this general type have excellent gel strength and viscosity characteristics, good stability against decomposition and flocculation, and low water loss values.

In said drilling fluids, the clay contributes to the various desirable physical properties of the composition, and in addition acts as a wall-building agent. During the drilling operation, whereby the drilling fluid is circulated down through the hollow drill stem and across the working face of the bore and is returned to the surface through the annular space between the drill stem and the walls of the bore, the clay coats or plasters the walls of the bore with a thin substantially water-impermeable cake or layer which serves to prevent the escape of the aqueous phase of the drilling fluid into permeable formations traversed by the bore. The clay employed for this purpose may be any clay which is capable of being hydrated by water to form a colloidal dispersion or gel, and is usually an impure product such as may be locally available at or near the well site, i. e., a mixture of hydratable clay with silica and/or other inert inorganic materials. Alternatively, high quality clays which contain a high proportion of hydratable material, e. g., bentonite, montmorillonite, etc., may be employed if desired. When ordinary impure clay is employed it is usually desirable to employ it in an amount sufficient to provide the composition with an apparent density of between about 65 and about 75 pounds per cubic foot. Should it be desired that the composition have an apparent density above about 75 pounds per cubic foot, the density may be increased to the desired value by the use of weighting agents, such as barytes, whiting, silica dust, red lead, etc., in the known manner. When a relatively pure clay such as bentonite is employed, it is usually provided in an amount representing between about 2.0 and about 8.0 per cent by weight of the entire composition, and the desired apparent density secured by use of suitable weighting agents.

The polyvalent metal salt component of the present drilling fluids serves to inhibit the swelling of hydratable clays which may be present in the various underground strata traversed and/or penetrated by the bore. In many oil fields, particularly those in certain sections of California, the producing formations contain substantial amounts of hydratable clays of the nature of bentonite and the like. When water is introduced into such formations, either from water-bearing formations previously traversed by the bore or through the use of a water-base drilling fluid, such clays become hydrated and swell to form gels which plug the pores of the formation and thereby shut off or at least hinder the flow of oil. Such swelling of clays in underground formations may give rise to further difficulties since the swollen clays have very little mechanical strength and may thus cause the walls of the bore to collapse, thereby necessitating expensive repair operations. It has been found, however, that in the presence of polyvalent metal ions, the tendency of clays to become hydrated by water is greatly diminished. Accordingly, there is provided in the present drilling fluids a source of polyvalent metal ions, i. e., a water-soluble polyvalent metal salt, which serves to inhibit the swelling action of the water in the drilling fluid on any clays which may be encountered during drilling. In order to prevent loss of the desired polyvalent metal ion as a result of reaction with the ferrous metal drilling equipment, the water-soluble salt employed should be a salt of a polyvalent metal higher than iron in the electromotive series of metals. As examples of such salts there may be mentioned the water-soluble salts of such metals as strontium, barium, calcium, magnesium, aluminum, manganese, zinc, chromium, etc., although for reasons of general availability and low cost the water-soluble salts of divalent metals, particularly alkaline-earth metals such as calcium, are preferred. Ordinarily, such salt is employed in an amount representing between about 0.01 to about 5.0 per cent by weight of the entire composition, although in some instances it may be desirable to provide as much as 10 per cent by weight of the composition.

The water-soluble cellulose ether component of the present drilling fluids serves a number of purposes, one of the most important of which is to inhibit the flocculation of the clay component by the polyvalent metal salt. As previously stated, polyvalent metal ions have an inhibiting effect on the swelling of hydratable clays in water. Such effect is desirable with respect to the hydratable clays present in the underground formations penetrated by the bore, and the polyvalent metal salt is provided in the drilling fluid for this purpose. On the other hand, it is essential that the clay component of the drilling fluid be in the hydrated deflocculated state if it is to fulfill its function as a wall-building agent. It has been found that certain water-soluble cellulose ethers stabilize hydrated clays against flocculation by polyvalent metal salts, and accordingly there is provided in the present drilling fluids a small amount of such a cellulose ether. Since the degree to which the cellulose ether is effective in stabilizing the clay against flocculation is reflected by the fluid loss value of the fluid, and since the amount of cellulose ether required to secure a given fluid loss value depends upon the nature of the cellulose ether itself as well as upon the nature and amount of the clay and polyvalent metal ion, it is convenient to express the proportion in which the cellulose ether is provided in the composition as the amount sufficient to maintain the fluid loss value below about 45 ml. per hour as determined by the standard API method (API Code No. 29, July 1942). Such amount is usually between about 0.01 and about 3 per cent by weight of the entire composition, although in some instances as much as 5 per cent by weight may advantageously be employed.

The cellulose ethers which may be employed in preparing the present drilling fluid composition are those alkyl ethers of cellulose which dissolve in water to form colloidal solutions and which do not react with polyvalent metal ions to form insoluble salts. A number of such cellulose ethers are known, e. g., methyl cellulose, certain types of ethyl cellulose, hydroxyethyl cellulose, hydroxypropyl cellulose, etc., each of which may be obtained in a number of viscosity grades and in varying degrees of etherification. If desired, these cellulose ethers may be employed in the crude form in which they are usually available commercially. Cellulose ethers which contain carboxylic salt-forming groups, e. g., carboxymethyl cellulose, are not suitable since such products form insoluble metal salts by reaction with many polyvalent metal ions in aqueous solution, and furthermore do not stabilize hydrated clays against flocculation by polyvalent metal ions. On the other hand, ethyl cellulose sulfonic acid is suitable since its polyvalent metal salts are water-soluble. By reason of its ready dispersibility in water and its efficiency in providing the desired stabilizing effect, methyl cellulose, particularly the type which does not form a gel when a 2 per cent by weight aqueous solution of the same is heated at temperatures up to about 180° F., is preferred in preparing the present drilling fluids.

The present invention is based on the discovery that the properties of the drilling fluids described above depend to a large extent on the manner in which the various components are combined. More particularly, we have found that the most desirable physical properties of gel strength, viscosity, filtration rate, etc. are attained in such drilling fluids when the clay component is hydrated prior to addition of the polyvalent metal salt and cellulose ether components. For example, if it is attempted to prepare the composition by dissolving the polyvalent metal salt in water and thereafter adding the clay and cellulose ether, it will be found that the composition obtained is unstable and substantially without gel strength. Upon standing for even short periods of time the clay settles to the bottom of the container leaving the aqueous phase as a thin supernatant muddy liquid. On the other hand, if the clay is added to the water and allowed to become hydrated prior to the addition of the polyvalent metal salt and cellulose ether, the composition takes the form of a stable thixotropic gel which maintains its uniform composition indefinitely. Such composition has excellent viscosity, gel strength, and fluid loss characteristics and remains stable during use and upon storage over long periods of time. The invention thus comprises the method of making drilling fluids whereby a hydratable clay is dispersed in water and allowed to become hydrated, after which there is then added a polyvalent metal salt and a cellulose ether of the nature hereinbefore defined.

In preparing drilling fluids according to the method of the invention, the initial hydration of the clay is effected simply by stirring the clay into the water and allowing it to stand until it is substantially completely hydrated. The time required for substantially complete hydration may vary from several minutes to several hours, depending upon the nature of the clay. Any of the hereinbefore-mentioned types of clay may be employed in the proportions previously given. Usually, when a more or less impure local clay is used, it is convenient to select the relative proportions of clay and water so that the aqueous dispersion of hydrated clay has an apparent density of between about 65 and 72 pounds per cubic foot. In some instances, as for example when it is desired that the drilling fluid have an apparent density of about 70–75 pounds per cubic foot without the use of weighting agents, the initial aqueous clay dispersion may be made up to have an apparent density of about 68 pounds per cubic foot, and the remainder of the clay added after incorporation of the polyvalent metal salt and cellulose derivative.

The previously described polyvalent metal salt and cellulose ether components may be added to the aqueous dispersion of hydrated clay in any order of precedence. Usually, however, it is more convenient to add the cellulose ether first and then add the polyvalent metal salt, although this order may be reversed if desired. Ordinarily, the cellulose ether and polyvalent metal salt are simply stirred into the aqueous clay dispersion in dry form and in the proportions previously specified. If desired, however, they may first be dispersed in a relatively small quantity of water to facilitate handling. Upon completion of the addition of the latter components, the composition is stirred to insure uniformity, after which it may be employed immediately as a drilling fluid, or it may be stored for future use.

The following examples will illustrate the manner in which the principle of the invention has been applied, but are not to be construed as limiting the same.

Example I

Santa Maria Valley (California) clay was stirred into fresh water and stirring was continued for about 20 minutes to insure substantially complete hydration of the clay. The relative proportions of water and clay were such that the resulting dispersion of hydrated clay had an apparent density of about 75 pounds per cubic foot. Commercial methyl cellulose comprising about 34 per cent methyl cellulose of the type having a precipitation point above about 180° F., the remainder being water and inorganic salts, was then added in an amount equivalent to 15 pounds per barrel of the aqueous clay dispersion. This quantity corresponds to about 1.2 per cent of methyl cellulose based on the weight of the entire composition. Solid calcium chloride was then added in an amount equivalent to 7 pounds per barrel of the clay dispersion, corresponding to about 1.6 per cent by weight of the entire composition. The resulting composition was a uniform semi-liquid gel which remained stable upon storage for an indefinite length of time at temperatures as high as 160° F. This composition was labeled "Fluid A."

A second composition was prepared employing the same components in the same proportions as in the preparation of "Fluid A" above. In this case, however, the calcium chloride was dissolved in the water, after which the clay was added followed by the addition of the methyl cellulose. The composition obtained was a relatively thin liquid mixture which did not display any appreciable gel characteristics and from which a large proportion of the clay settled out upon standing for several hours at room temperature. This composition was labeled "Fluid B."

The physical properties of fluids A and B are tabulated below:

| | Fluid A | Fluid B |
|---|---|---|
| API Funnel Viscosity, Sec | 72 | 47 |
| Fluid Loss, ml. in first 15 min | 2.9 | 2.1 |
| Gel Strength, lbs./100 sq. ft. after 10 min. standing | 7.8 | 0 |
| Weight, lbs./cu. ft | 75 | 75 |

It will be noted from these data that although fluid B was satisfactory from the standpoint of initial viscosity and fluid loss properties, its entire lack of gel strength precluded satisfactory use as a drilling fluid.

Example II

Santa Maria Valley (California) clay was stirred into fresh water and allowed to become substantially completely hydrated. The resulting clay dispersion, which had an apparent density of about 72 pounds per cubic foot, was divided into a number of portions to each of which there was then added methyl cellulose of a particular viscosity grade and a polyvalent metal salt. The composition and properties of each of the drilling fluids so prepared are tabulated as follows:

| Sample No. | Cellulose Ether [1] | Polyvalent Metal Salt [1] | Viscosity Secs. [2] | Fluid Loss, Ml./1st 5 Min. [3] |
|---|---|---|---|---|
| 1 | 0.8% Methyl cellulose, med. vis | 1.0% Calcium Chloride | 38 | 1.5 |
| 2 | 0.8% Methyl cellulose, med. vis | 1.0% Zinc Chloride | 32 | 2.0 |
| 3 | 0.8% Methyl cellulose, med. vis | 1.0% Aluminum Chloride | 30 | 2.4 |
| 4 | 0.4% Methyl cellulose, med. vis | 1.0% Calcium Chloride | 25 | 17.2 |
| 5 | 0.6% Methyl cellulose, med. vis | 1.0% Calcium Chloride | 35 | 5.3 |
| 6 | 0.8% Methyl cellulose, med. vis | 1.0% Calcium Chloride | 41 | 3.6 |
| 7 | 0.4% Methyl cellulose, low vis | 1.0% Calcium Chloride | 24 | 17.5 |
| 8 | 0.6% Methyl cellulose, low vis | 1.0% Calcium Chloride | 25 | 7.4 |
| 9 | 0.8% Methyl cellulose, low vis | 1.0% Calcium Chloride | 28 | 5.3 |
| 10 | 0.4% Methyl cellulose, high vis | 1.0% Calcium Chloride | 23 | 14.3 |
| 11 | 0.8% Methyl cellulose, high vis | 1.0% Calcium Chloride | 42 | 3.7 |
| 12 | 0.6% Methyl cellulose, med. vis | 0.5% Calcium Chloride | 36 | 4.9 |
| 13 | 0.6% Methyl cellulose, med. vis | 1.0% Calcium Chloride | 35 | 5.3 |
| 14 | 0.6% Methyl cellulose, med. vis | 1.5% Calcium Chloride | 39 | 5.8 |

[1] Percentages are based on weight of entire composition.
[2] Time for 500 ml. sample to run through standard Marsh funnel.
[3] Fluid loss/hour = approximately 4 × fluid loss/1st 5 min.

All of the above compositions were stable thixotropic semi-liquid gels from which the solids did not settle out upon standing.

Example III

Approximately 525 parts by weight of Rogers Lake clay was stirred into 1350 parts by weight of water. Stirring was continued for about 20 minutes to insure complete hydration of the clay, after which there was then added 18 parts by weight of hydroxyethyl cellulose. Finally, 30 parts by weight of solid calcium chloride was stirred into the mixture. The composition so obtained was a stable semi-solid suspension having excellent gel strength characteristics. A similar composition may be prepared using water-soluble ethyl cellulose instead of the hydroxyethyl cellulose.

The drilling fluids prepared as herein described may also contain a variety of other components, e. g. ammonium or alkalimetal soaps of petroleumsulfonic acids, higher fatty acids, or naphthenic acids; bactericides; conditioning agents such as quebracho or alkali-metal phosphates; asphalt; weighting agents; anti-foaming agents, such as tributyl phosphate; etc. Any of such optional components may be added to composition at any time after the initial formation of the aqueous dispersion of hydrated clay. The essence of the invention lies in forming such hydrated clay dispersion prior to the addition of the polyvalent metal salt.

Other modes of applying the principle of our invention may be employed instead of those explained, change being made as regards the materials employed provided the step or steps stated by any of the following claims, or the equivalent of such stated step or steps, be employed.

We, therefore, particularly point out and distinctly claim as our invention:

1. The method of making a drilling fluid which comprises mixing a hydratable clay with water to form an aqueous dispersion of hydrated clay having an apparent density between about 65 and about 75 pounds per cubic foot, and thereafter adding a water-soluble cellulose ether which does not form insoluble salts with polyvalent metal ions and a water-soluble polyvalent metal salt, said metal salt being employed in an amount representing between about 0.01 and about 10 per cent by weight of the entire composition and said cellulose ether being employed in an amount sufficient to maintain the filtration rate of the composition at a value below about 45 ml. per hour.

2. The method of claim 1 wherein the cellulose ether is water-soluble methyl cellulose.

3. The method of claim 1 wherein the cellulose ether is water-soluble hydroxyethyl cellulose.

4. The method of claim 1 wherein the cellulose ether is water-soluble methyl cellulose of the type which does not form a gel when a 2 per cent by weight aqueous solution of the same is heated to temperatures below about 180° F.

5. The method of claim 1 wherein the polyvalent metal salt is a water-soluble alkaline-earth metal salt.

6. The method of claim 1 wherein the polyvalent metal salt is a water-soluble calcium salt.

7. The method of claim 1 wherein the polyvalent metal salt is calcium chloride.

8. The method of preparing a drilling fluid which comprises mixing sufficient of a hydratable clay with water to obtain an aqueous dispersion of hydrated clay having an apparent density between about 65 and about 75 pounds per cubic foot, and thereafter adding a water-soluble cellulose ether which does not form insoluble salts with polyvalent metal ions in an amount representing between about 0.01 and about 3 per cent by weight of the entire composition and a water-soluble polyvalent metal salt in an amount representing between about 0.01 and about 5 per cent by weight of the entire composition.

9. The method of claim 8 wherein the cellulose ether is water-soluble methyl cellulose.

10. The method of claim 8 wherein the cellulose ether is water-soluble hydroxyethyl cellulose.

11. The method of claim 8 wherein the cellulose ether is water-soluble methyl cellulose which does not form a gel when a 2 per cent by weight aqueous solution of the same is heated to a temperature below about 180° F.

12. The method of claim 8 wherein the polyvalent metal salt is a water-soluble alkaline earth metal salt.

13. The method of claim 8 wherein the polyvalent metal salt is a water-soluble calcium salt.

14. The method of claim 8 wherein the polyvalent metal salt is calcium chloride.

15. In a method of preparing a drilling fluid which comprises an aqueous dispersion of a hydratable clay, a water-soluble polyvalent metal salt, and a water-soluble cellulose ether which does not form insoluble metal salts with polyvalent metal ions, the step which consists in securing substantially complete hydration of the clay in the aqueous phase prior to the addition of the polyvalent metal salt and the cellulose ether.

16. In a method of preparing a drilling fluid which comprises an aqueous dispersion of a hydratable clay, calcium chloride, and water-soluble methyl cellulose, the step which consists in substantially completely hydrating the clay in the water prior to addition of the calcium chloride and methyl cellulose.

PAUL W. FISCHER.
RAYMOND A. ROGERS.

REFERENCES CITED

The following references are of record in the file of this patent:

UNITED STATES PATENTS

| Number | Name | Date |
|---|---|---|
| 2,044,758 | Cross et al. | June 16, 1936 |
| 2,073,413 | Cross et al. | Mar. 9, 1937 |
| 2,357,497 | Bond | Sept. 5, 1944 |
| 2,365,383 | Bond | Dec. 19, 1944 |
| 2,425,768 | Wagner | Aug. 19, 1947 |
| 2,489,521 | Carlson | Nov. 29, 1949 |
| 2,498,301 | Self | Feb. 21, 1950 |
| 2,499,548 | Wagner et al. | Mar. 7, 1950 |
| 2,510,153 | Swinehart | June 6, 1950 |

OTHER REFERENCES

Sherborne et al., Use of Improved Drilling Fluids in Well Completion, paper presented at Los Angeles, Calif., meeting of the American Institute of Mining and Metallurgical Engineers, October 14, and 15, 1948, 14 pages text, 8 pages of drawings.